UNITED STATES PATENT OFFICE.

JAMES P. A. McCOY, OF WILKINSBURG, PENNSYLVANIA, ASSIGNOR TO WESTINGHOUSE ELECTRIC AND MANUFACTURING COMPANY, A CORPORATION OF PENNSYLVANIA.

MOLDED ELECTRIC CONDUCTOR AND PROCESS OF MAKING THE SAME.

1,299,846.     Specification of Letters Patent.     Patented Apr. 8, 1919.

No Drawing.     Application filed October 9, 1915. Serial No. 54,991.

*To all whom it may concern:*

Be it known that I, JAMES P. A. McCOY, a subject of the King of Great Britain, and a resident of Wilkinsburg, in the county of Allegheny and State of Pennsylvania, have invented a new and useful Improvement in Molded Electric Conductors and Processes of Making the Same, of which the following is a specification.

My invention relates to the manufacture of electric current-carrying bodies such as commutator brushes, resistors and electrodes, and it has special reference to processes of making such bodies by molding pulverulent conducting material with a suitable binder.

One of the objects of my invention is to provide a series of current-carrying elements of the above indicated character which shall have superior electrical and other physical characteristics and which, in particular, shall be exceedingly strong and of accurately controllable current-carrying capacity.

Another object of my invention is to provide a simple and expeditious process of making commutator brushes and other current-carrying elements.

My present invention is based upon the discovery that, when powdered conducting materials are molded with certain specific binders, the resulting articles possess unexpectedly desirable properties, both with respect to their physical strength and their capacity for conducting electric currents. The binders which I employ for my present purpose comprise resinous products of the partial or complete polymerization of certain aromatic carbon compounds, particularly indene, cumaron and their isomers.

The preparation of these substances, together with certain of their uses in the molding art, are described in my copending application for patent, Serial No. 20,752, filed Apr. 2, 1915. As stated in my copending application, indene and cumaron are both produced in the fractional distillation of coal tar and may also be prepared synthetically. Another source of these substances is the gas evolved from coke ovens and other coal-distilling apparatus. The usual practice is to recover from the benzol still, in the fractional distillation of coal tar, the fraction which passes over between 160° C. and 180° C. This fraction may be directly treated with an acid, commonly sulfuric acid, accompanied by artificial cooling, to precipitate a liquid containing partially polymerized indene and cumaron. If solid resins are desired, the distillate is freed from tar acids by the usual neutralizing methods, and the resins are precipitated with sulfuric acid and redistilled, the distillation being performed with steam or accompanied by reduced pressure if light colored resins are desired. The resinous product remains in the still in which the last distillation is carried out. For my present purpose, I prefer to use solid resins prepared in the manner just described, the resins being liquefied at the time of molding by heating in a steam kettle.

A remarkable property of the resinous derivatives of indene and cumaron is that they liquefy to an almost watery degree of mobility when moderately heated. In this very liquid condition, the binder is mixed with any suitable conducting substance and molded into any desired form of current-conducting element. The filler may be carbon, powdered metal or a mixture of carbon and powdered metal, and the carbon employed may be any of the well-known varieties of electric carbon, the kind selected depending upon the desired characteristics of the finished products. Thus, for soft commutator brushes of high current-carrying capacity, powdered graphite is employed, while, for hard brushes, powdered coke may be used.

The proportions in which the foregoing binders may be mixed with current-conducting powdered material may be varied within very wide limits, the characteristics of the resulting products being changed accordingly. Where very great strength is desired, the proportion of the binder may be increased to 50% or even more, while, when high current-carrying capacity is the chief requirement, the amount of the binder may be reduced as low as 10% or even lower.

On account of the fluid condition of the melted resinous binder, the use of a solvent is unnecessary. After the molded articles are formed, which may be done either by hot molding or cold molding methods, the articles are baked to remove the binder as completely as possible. The articles are first baked at a low heat about 50° C., and the heat is gradually raised to about 1,000° C. After the first baking treatment, I find it advantageous to impregnate the molded articles again with the liquid binding material and to repeat the baking operation.

The product of the foregoing process contains only a very minute amount of residue left by the binder, which has a very much smaller ash than the binders which have heretofore been used for similar purposes. A further superiority of these binders over the binders heretofore used is that the binders herein described do not swell on heating, as is the case with most ordinary binders. Therefore, careful heating of the molded articles removes the binder almost completely, without in any way disturbing the relative positions of the particles of filler of which the articles are mainly composed. The absence of solvent also contributes to this result, since, when ordinary dissolved binders are used, the solvent present must be expelled, leaving behind it interstices of considerable volume.

When carbon is employed as the filler, either with or without the addition of powdered metal, it is found that the resulting articles possess a considerably lower electric resistance than similar articles composed of the same materials and prepared with other binders or without any binders. This superiority seems to result partly from the absence of spaces between the carbon particles and partly from a positive change produced in the carbon by the binder. The exact nature of this change I am unable to state, but it is evident that the binders herein described have a highly beneficial effect upon the powdered carbon with respect to its current-carrying capacity. The articles prepared in the foregoing manner are also superior in tensile strength to similar articles which have heretofore been made. This is an important advantage and appears to result from the peculiar interaction between the binder and the carbon referred to above.

My present invention may be advantageously employed in making many different kinds of conducting elements in addition to those specifically mentioned above. For example, the molding materials herein described may be used for making crucibles, to replace the ordinary expensive graphite crucibles, for making electric furnace linings and, in general, for all purposes where a molded conductor can be used.

The specific proportions and process steps which I have enumerated may be variously modified by persons skilled in the art without departing from the principles of my invention, and it is therefore to be understood that no limitations are to be imposed upon my invention except such as are indicated in the appended claims.

I claim as my invention:

1. An electric current-carrying element formed of a molded mass of pulverulent conducting material which has been combined by means of a binder containing at least one of a group of substances including indene, cumaron and their isomers and the polymerization products of these substances.

2. The method of making electric brushes and other current-carrying bodies that comprises molding a pulverulent conducting material with a binder that is readily liquefiable by heat and heating the molded articles to expel nearly all of the said binder.

3. The method of making electric brushes and other current-carrying elements that comprises molding a pulverulent conducting material with a binder that may be substantially removed by heat without expanding, and heating the molded articles to expel the said binder.

4. The method of making electric brushes and other current-carrying elements that comprises molding a pulverulent conducting material with a binder containing at least one of a group of substances comprising indene, cumaron and their isomers and the polymerization products of these substances, and heating to expel nearly all of the said binder.

5. The method of making electric curent-carrying elements that comprises molding a pulverulent conducting material with a binder containing at least one of a group of substances comprising indene, cumaron and their isomers and the polymerization products of these substances, heating the molded element to expel nearly all of the said binder, impregnating the element so treated with more of the binder and again heating the element to expel substantially all of the binder.

In testimony whereof, I have hereunto subscribed my name this 30th day of Sept., 1915.

JAMES P. A. McCOY.